(12) United States Patent
Lee, IV et al.

(10) Patent No.: US 7,946,252 B2
(45) Date of Patent: May 24, 2011

(54) ELECTRONIC ANIMAL TRAINER WITH TEMPERAMENT LEARNING

(75) Inventors: Albert L. Lee, IV, Seymour, TN (US); Christopher E. Mainini, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 422 days.

(21) Appl. No.: 11/261,821

(22) Filed: Oct. 28, 2005

(65) Prior Publication Data
US 2007/0095303 A1    May 3, 2007

(51) Int. Cl.
*A01K 15/02*    (2006.01)
*G08B 23/00*    (2006.01)
(52) U.S. Cl. ..................................... 119/718; 340/573.3
(58) Field of Classification Search .................. 119/765, 119/718, 719, 720, 760, 859, 908; 340/573.3
See application file for complete search history.

(56) References Cited

U.S. PATENT DOCUMENTS

| | | | | |
|---|---|---|---|---|
| 6,058,889 | A * | 5/2000 | Van Curen et al. | 119/721 |
| 6,604,490 | B1 * | 8/2003 | Lee et al. | 119/712 |
| 6,668,760 | B2 * | 12/2003 | Groh et al. | 119/718 |
| 6,715,444 | B1 * | 4/2004 | Yabusaki et al. | 119/421 |
| 6,799,537 | B1 * | 10/2004 | Liao | 119/720 |
| 6,860,240 | B2 * | 3/2005 | Kim et al. | 119/719 |
| 6,928,958 | B2 * | 8/2005 | Crist et al. | 119/718 |
| 7,000,570 | B2 * | 2/2006 | Napolez et al. | 119/718 |
| 7,126,483 | B2 * | 10/2006 | Zarouri | 340/573.1 |
| 7,198,009 | B2 * | 4/2007 | Crist et al. | 119/718 |
| 7,252,051 | B2 * | 8/2007 | Napolez et al. | 119/718 |
| 2005/0145196 | A1 * | 7/2005 | Crist et al. | 119/718 |

* cited by examiner

*Primary Examiner* — Timothy D Collins
*Assistant Examiner* — Joseph W Sanderson
(74) *Attorney, Agent, or Firm* — Pitts & Brittian, P.C.

(57) ABSTRACT

An electronic animal trainer with temperament learning. The electronic animal trainer with temperament learning learns and remembers the response pattern of the animal to the correction stimulus to provide a customized training profile.

23 Claims, 6 Drawing Sheets

ELECTRONIC ANIMAL TRAINER WITH TEMPERAMENT LEARNING

CROSS REFERENCE TO RELATED APPLICATIONS

Not Applicable

STATEMENT REGARDING FEDERALLY-SPONSORED RESEARCH OR DEVELOPMENT

Not Applicable

BACKGROUND OF THE INVENTION

1. Field of Invention

The invention relates to an electronic animal training apparatus. More specifically, this invention relates to an electronic animal training apparatus that adjusts the intensity of the applied correction stimulus based upon the temperament of the animal.

2. Description of the Related Art

In its simplest form, electronic animal training involves the application of a correction stimulus to an animal in response to an undesirable behavior. A device designed to deliver a single intensity corrective stimulus cannot adapt to the situation and, therefore, is not always effective or is sometime excessive, as the case may be. For example, one correction stimulus may be too much for a timid dog or one with a low pain threshold. That same correction stimulus may not be sufficient to get the attention of a larger, more aggressive dog. In addition to the physical and mental characteristics of the dog, the situational characteristics are also relevant to the appropriateness of the correction stimulus intensity. For example, a dog in a high stress situation, where hormones such as adrenaline are active, may completely ignore a correction stimulus that would normally get the attention of the dog.

More sophisticated training devices offer the ability to manually adjust the intensity of the correction stimulus, which allows the trainer to adjust the training to suit the physical/mental characteristics of the dog. However, a manual adjustment cannot adapt to changes demanded by the situation at the time of the correction.

A further refinement to electronic animal training devices is to provide for an automatic adjustment of the intensity of the correction stimulus until the desired behavior is achieved. Generally, automatic adjustment of the intensity is desirable with unattended electronic animal training devices, such as bark control collars. Currently available bark control collars use a simple method of linearly increasing the intensity of the correction stimulus while the trigger behavior (barking) continues. Although ultimately effective, linear intensity increases are not always conducive to good training practices. Basically, the delay in reaching an effective intensity to deter the barking results in variable amount of time that the dog is permitted to bark without an effective deterrent. Accordingly, the dog does not quickly or easily learn that more than a few barks are unacceptable.

BRIEF SUMMARY OF THE INVENTION

An electronic animal trainer with temperament learning is described herein and shown. The electronic animal trainer with temperament learning learns and remembers the response pattern of the animal to the correction stimulus to provide a customized training profile.

The core of the electronic animal trainer is the processing unit. A triggering device, such as a bark detector, is connected to the processing unit. The electronic animal trainer with temperament learning also includes stimulus generator and a stimulus delivery system. The stimulus generator produces the driving signal of the stimulus. The stimulus delivery system is the interface that transfers the stimulus from the electronics to the dog.

For temperament learning, the electronic animal trainer with temperament learning includes a bark counter, an episode counter, an episode timer, a time-out timer, a base correction intensity storage unit, and an applied correction intensity storage unit. The bark counter keeps track of the progressive number of barks that occur during a single bark episode. The episode counter keeps track of the total number of bark episodes that occur. The episode timer is used to measure the duration of a bark episode. The time-out timer is used to prevent excessive stimulation of the animal. The base correction intensity storage unit holds the value of the base correction intensity. The base correction intensity is the starting point for the intensity of the correction. By adjusting the base correction intensity, the electronic animal trainer with temperament learning provides a correction profile that is customized to the animal. Corrections start at an intensity that historically is likely to get the attention of the dog. Bypassing ineffective correction intensities results in more effective training and more quickly deters the dog from undesirable behavior. The applied correction intensity storage holds the value of the instant correction intensity. Starting at the base correction intensity, the applied correction intensity increases during the barking episode while the dog continues to bark. This allows the intensity to vary in response to the behavior of the dog, i.e., a prompt cessation of barking results in a lower intensity correction and a continuing barking episode warrants a stronger correction.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An electronic animal trainer with temperament learning is described herein and shown at 100 in the figures. The electronic animal trainer with temperament learning 100 learns and remembers the response pattern of the animal to the correction stimulus to provide a customized training profile.

Figure 1:
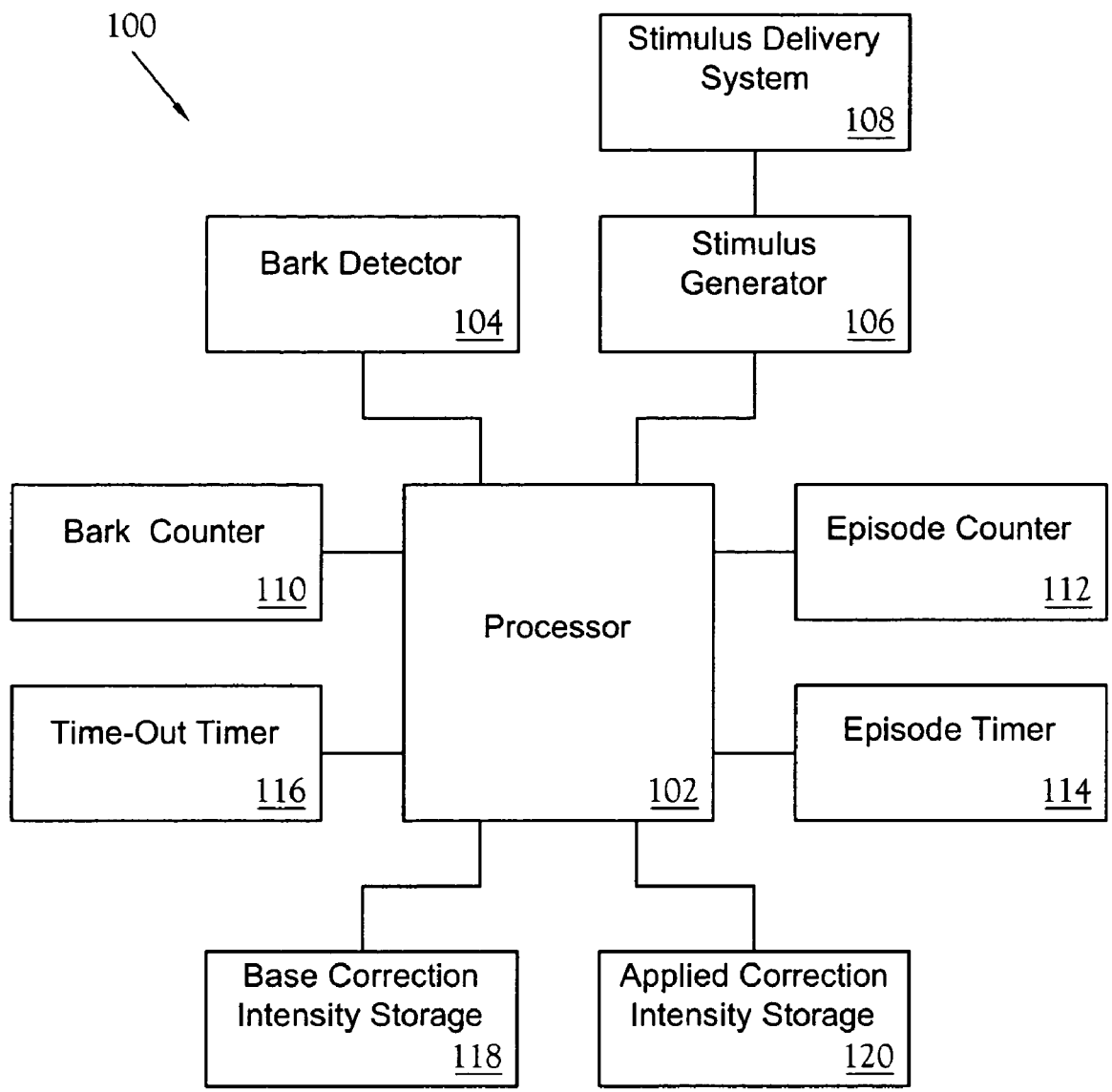
FIG. 1 is block diagram of one embodiment of an electronic animal training device having temperament learning.

FIG. 1 illustrates a block diagram of one embodiment of the electronic animal trainer with temperament learning 100. The core of the electronic animal trainer is the processing unit 102. The illustrated embodiment of the electronic animal trainer with temperament learning 100 includes a triggering unit, such as a bark detector 104. In general, the triggering unit detects a behavior of the animal and produces a triggering signal when the behavior is detected. Barking is a behavior that is easily detected and corrected without the need for intervention by a human. Those skilled in the art should appreciate that the bark detector could be substituted with a triggering unit for another behavior that are detected and corrected without the need for human intervention without departing from the scope and spirit of the present invention. The bark detector 104 includes the necessary electronics based upon the type of bark detection contemplated. In one embodiment, the bark detector 104 includes a microphone and the associated signal conditioning electronics to interface the bark detector to the processor unit 102. In another embodiment, the bark detector 104 includes a vibration sensor and the associated signal conditioning electronics to interface the bark detector to the processor unit 102. In a still further embodiment, the bark detector 104 includes both a microphone and a vibration sensor and the associated signal conditioning electronics to interface the bark detector to the processor unit 102.

The electronic animal trainer with temperament learning 100 also includes stimulus generator 106 and a stimulus delivery system 108. The stimulus generator 106 produces the driving signal of the stimulus. The stimulus delivery system is the interface that transfers the stimulus from the electronics to the dog. Those skilled in the art will appreciate the various types of stimuli that are available as deterrent stimuli that can be used without departing from the scope and spirit of the present invention. Examples include the use of an electrical shock coupled with an associated audible warning, an olfactory deterrent (e.g., citronella sprays), or a canine/animal audible deterrent (e.g., ultrasonic noises).

For temperament learning, the electronic animal trainer with temperament learning 100 includes a bark counter 110, an episode counter 112, an episode timer 114, a time-out timer 116, a base correction intensity storage unit 118, and an applied correction intensity storage unit 120. The bark counter 110 keeps track of the progressive number of barks that occur during a single bark episode. The episode counter 112 keeps track of the total number of bark episodes that occur. The episode timer 114 is used to measure the duration of a bark episode. The time-out timer 116 is used to prevent excessive stimulation of the animal. The base correction intensity storage unit 118 holds the value of the base correction intensity. The base correction intensity is the starting point for the intensity of the correction. By adjusting the base correction intensity, the electronic animal trainer with temperament learning 100 provides a correction profile that is customized to the animal. Corrections start at an intensity that historically is likely to get the attention of the dog. Bypassing ineffective correction intensities results in more effective training and more quickly deters the dog from undesirable behavior. The applied correction intensity storage 120 holds the value of the instant correction intensity. Starting at the base correction intensity, the applied correction intensity increases during the barking episode while the dog continues to bark. This allows the intensity to vary in response to the behavior of the dog, i.e., a prompt cessation of barking results in a lower intensity correction and a continuing barking episode warrants a stronger correction.

Those skilled in the art will appreciate that the block diagram in FIG. 1 is not intended to show every component or interconnection of the electrical circuitry. Obvious components, such as a power source, and common interconnections such as power supply lines and routine circuitry associated with basic circuit design functions including regulation, trimming, and buffering have been omitted. The use and implementation of the omitted features is deemed to be within the purview of one skilled in the art.

Figure 2:
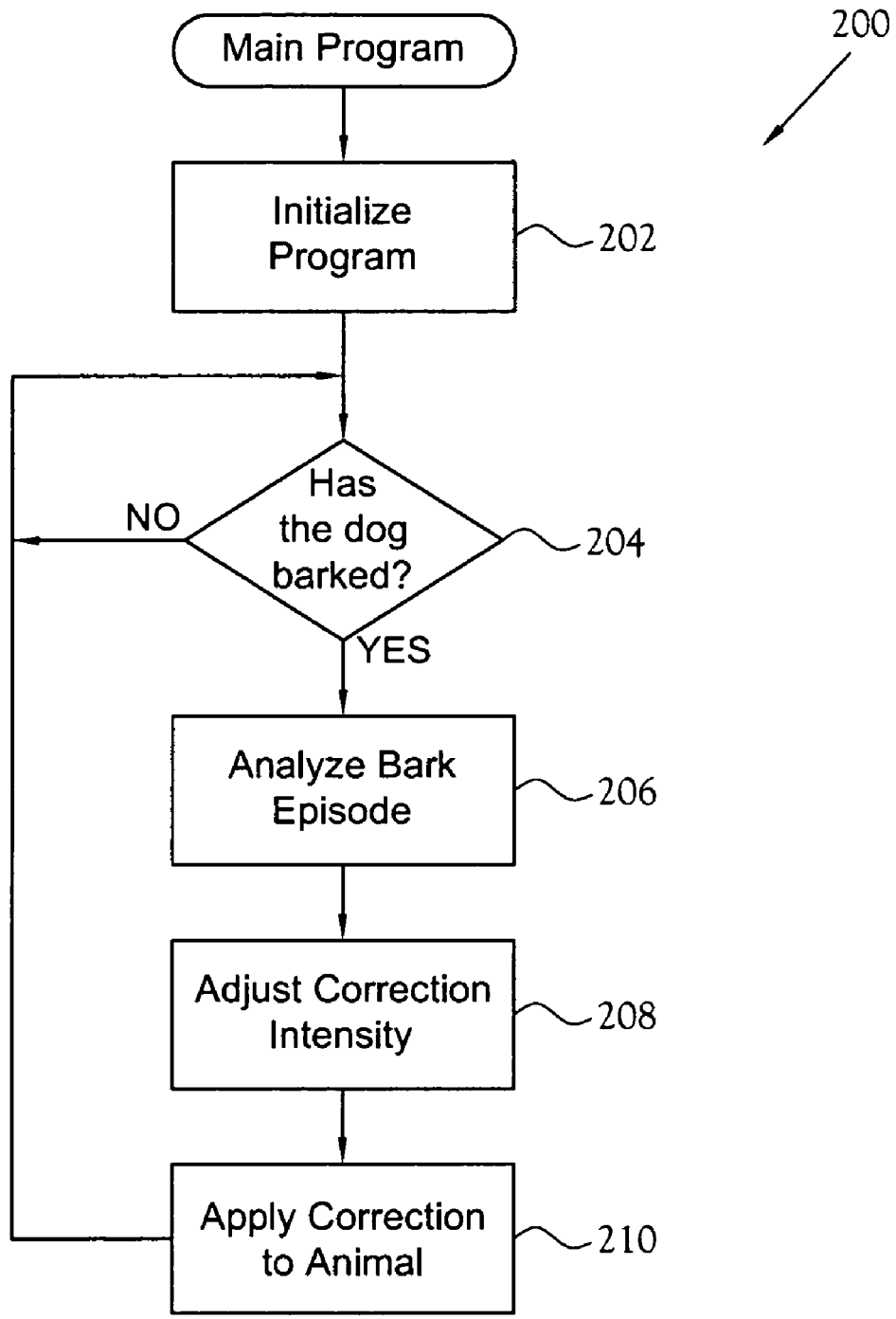
FIG. 2 is a flow diagram of the overall temperament learning method.

FIG. 2 is a flow diagram of the temperament learning method 200 applied by the electronic animal trainer with temperament learning 100. To begin, the temperament learning method 200 is placed 202 in a known state. Once in a known state, the electronic animal trainer with temperament learning 100 listens 204 for barking by the dog being trained. If a bark is detected, the barking is analyzed 206 to determine whether the dog is responding to correction. Based upon the results, the correction profile is adjusted 208, if necessary. A correction is applied 210 to the animal using the current correction profile.

Figure 3:
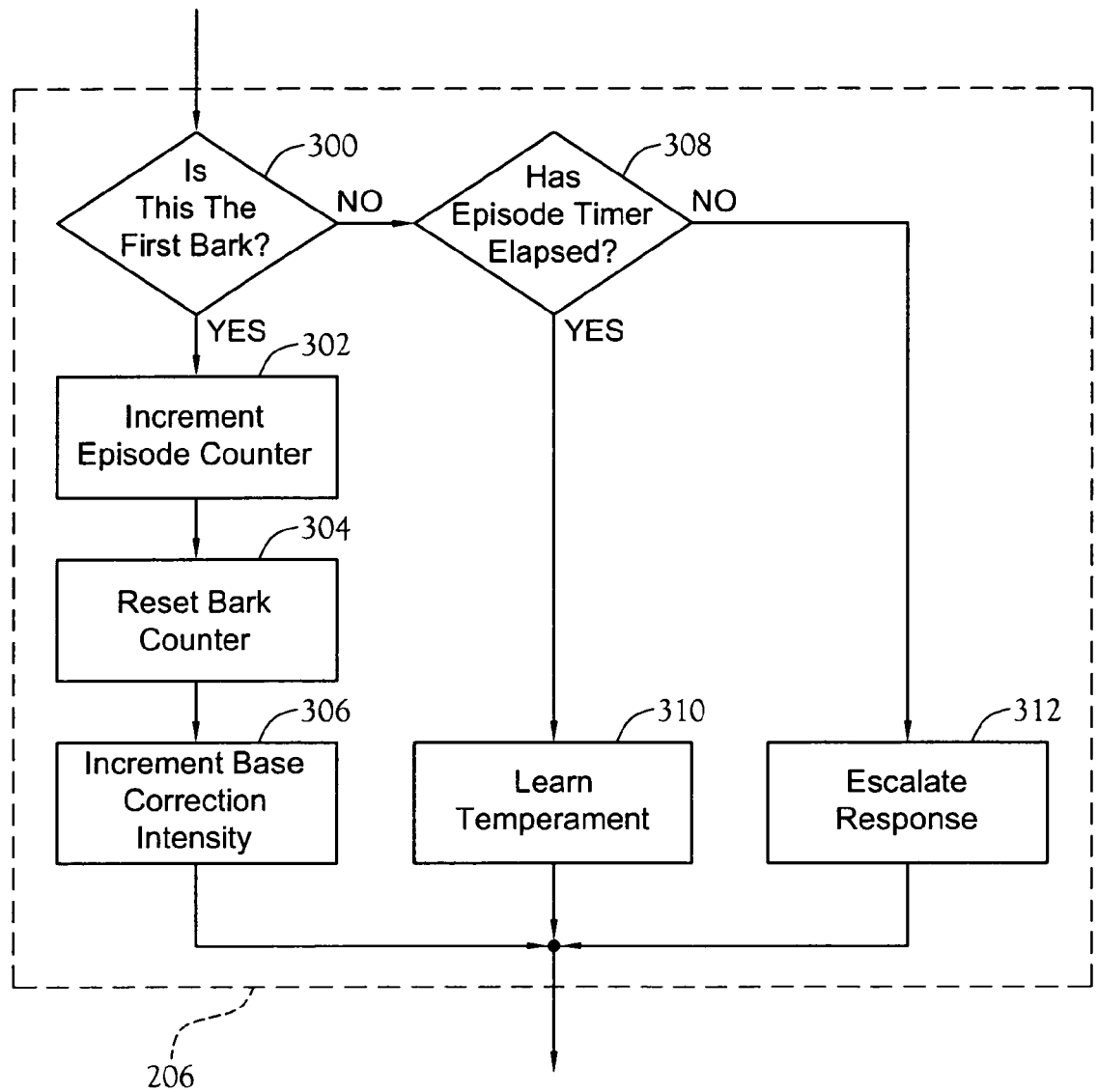
FIG. 3 is a flow diagram of the portion of the temperament learning method pertaining to bark episode analysis.

FIG. 3 is a flow diagram examining the step of analyzing the barking 206 in greater detail. To begin with, the bark analysis 206 determines whether the dog has previously barked 300. In one embodiment, the episode counter 112 is initialized to zero when the temperament learning method 200 is placed in a known state 202. If the dog has not previously barked, the episode counter 112 has a value of zero. A non-zero value in the episode counter 112 signifies that previous bark activity has been detected. For the first bark of the first barking episode, the temperament learning method 200 performs the following steps. The temperament learning method 200 increments 302 the episode counter 112, resets 304 the bark counter, and sets 306 the initial value of the base correction intensity. In one embodiment, the initial value of the episode counter 112 is one, the initial value of the bark counter 110 is zero, and the initial value of the base correction intensity is one.

For the second and subsequent bark episodes, the temperament learning method 200 checks the status 308 of the episode timer 114. In one embodiment, the episode timer is used to measure 30-second intervals corresponding to a single bark episode. Various implementations for the episode timer 114 are available including a countdown timer that counts down for 30 seconds an ascending timer that counts up the time of the entire bark episode. If the specified time, e.g., 30 seconds, passes since the last detected bark, the bark episode is considered closed and the temperament of the dog is learned 310. If barking continues before the specified time elapses, the temperament learning method 200 escalates 312 the corrections to the dog.

Figure 4:
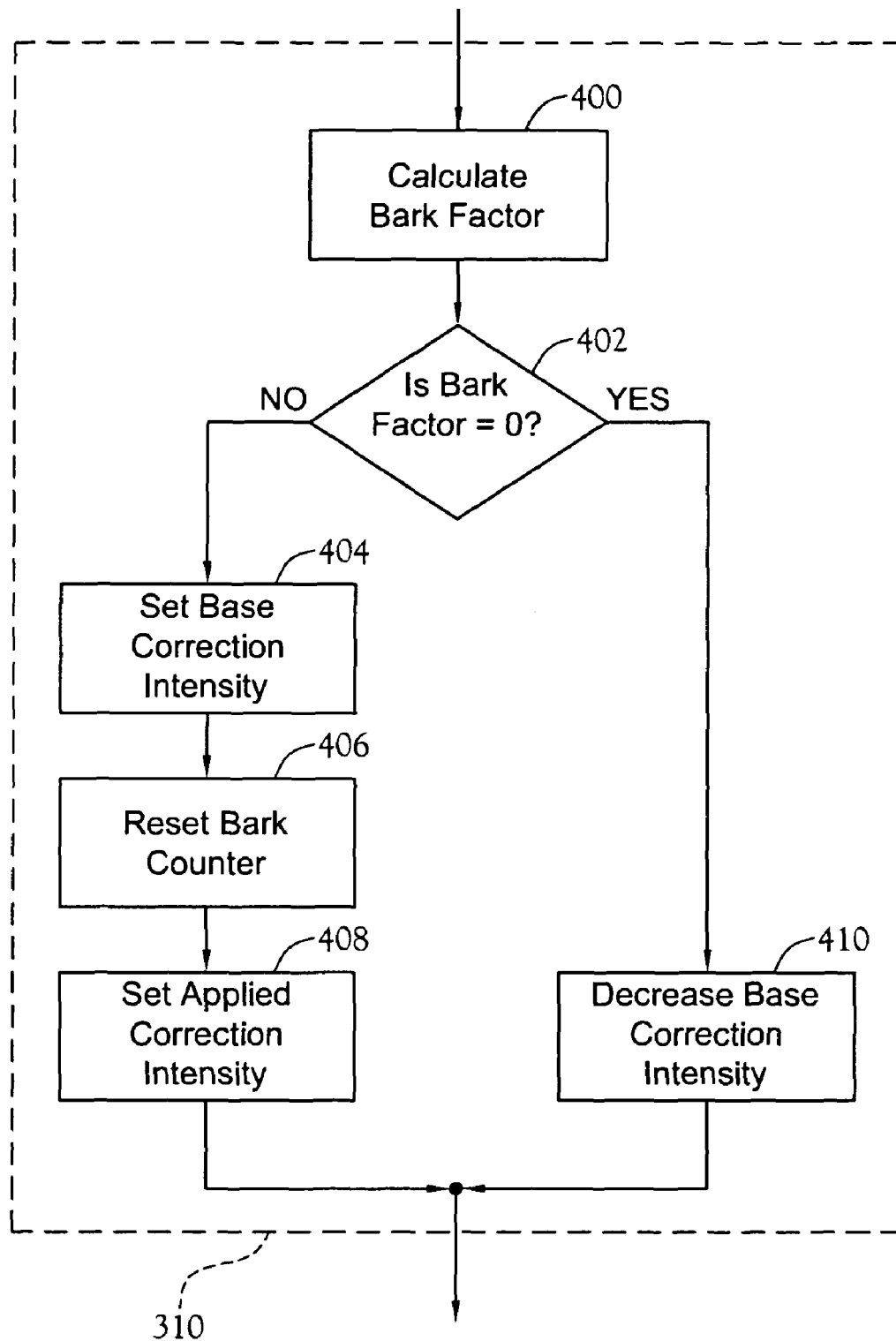
FIG. 4 is a flow diagram of the portion of the temperament learning method pertaining to learning the dog's temperament.

FIG. 4 is a flow diagram examining the step of learning 310 the temperament of the dog in greater detail. When learning the temperament of the dog, the first step is to calculate 400 the bark factor. In one embodiment, the bark factor is calculated by dividing the value of the bark counter by two and rounding the result down to the nearest integer. The resulting bark factor is compared 402 to determine the appropriate action for the new bark episode. If the bark factor is greater than zero, the base correction intensity value is set using the bark factor 404. In one embodiment, the new base correction intensity is equal to the current base correction intensity plus the bark factor. Because more than 30 seconds has passed since the previous bark, the bark is considered the start of a new bark episode and the bark counter is reset 406. The applied correction intensity is then set 408 using the new values of the base correction intensity and the bark counter. Conversely, if the bark factor is zero, the base correction intensity is reduced 410.

Figure 5:
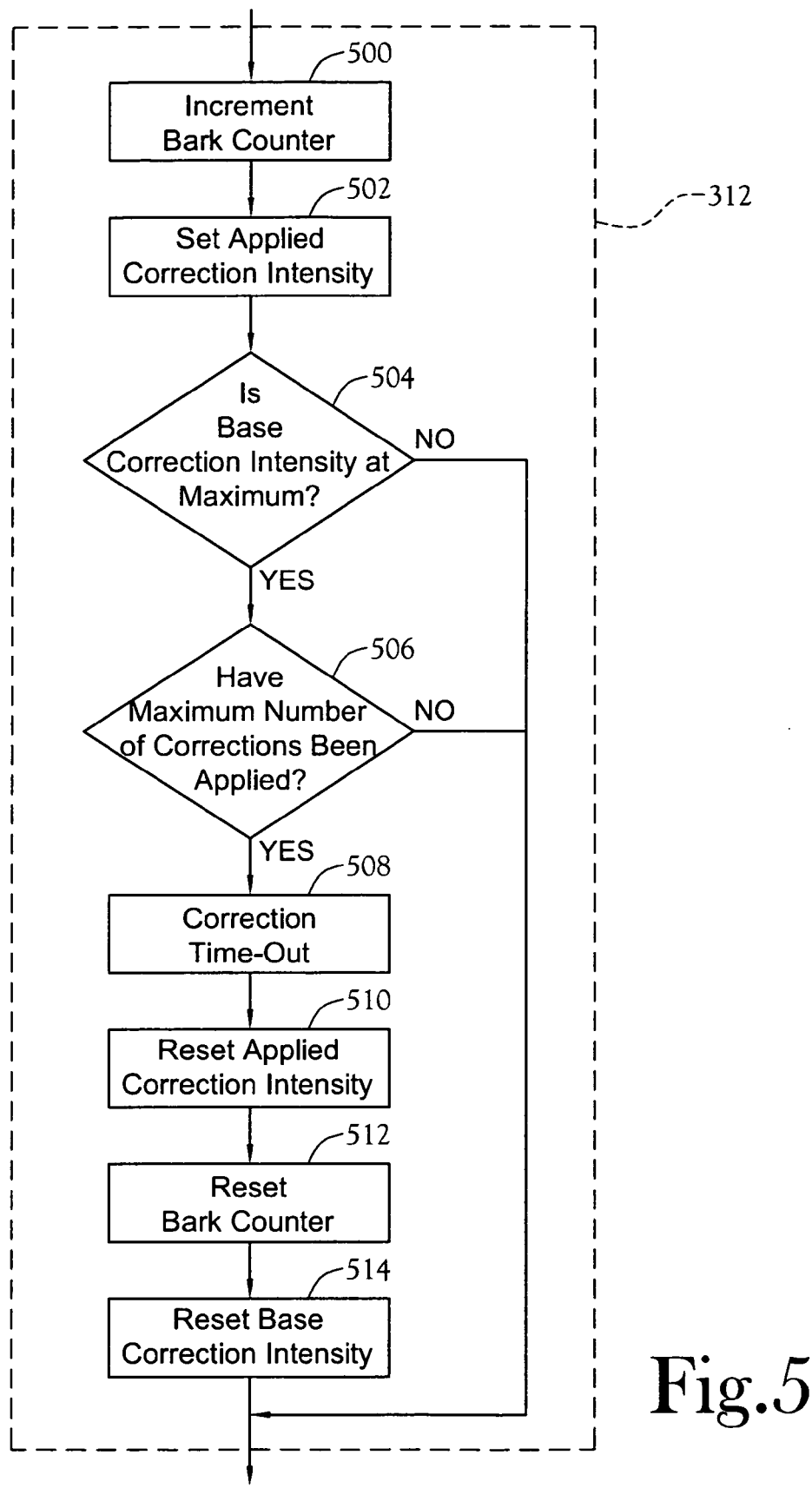
FIG. 5 is a flow diagram of the portion of the temperament learning method pertaining to increasing the base correction intensity.

FIG. 5 is a flow diagram examining the step of escalating 312 the response in greater detail. Initially, the bark counter is incremented 500 to keep track of the number of barks occurring within the bark episode. Next, the applied correction intensity is set 502. In one embodiment, the applied correction intensity is equal to the base correction intensity plus the value of the bark counter. The value of the base correction intensity is compared 504 to the maximum allowable value. If the base correction intensity equal to the maximum, the value of the bark counter is compared 506 to the maximum allowable value within a selected time period, a correction time-out sequence 508 begins. The correction time-out sequence prevents the dog from continuing to receive correction stimuli at the maximum intensity level during extended barking episodes. In one embodiment, the maximum allowable number of barks is 15 barks within a one minute period. Generally, if the dog receives 15 corrections at the maximum intensity within one minute, i.e., one every four seconds, it follows that the correction stimuli are not having the desired deterrent effect or there is a problem with the device. The correction time-out sequence generally results in a three-minute sleep period where no correction stimuli are issued. Following, the correction time-out sequence, the device is reset to the initial conditions. The applied correction intensity is reset 510. The bark counter is reset 512. Finally, the base correction intensity is reset 514. In one embodiment, the applied correction intensity is set to 0, the bark counter 110 is set to 0, and the base correction intensity is set to 1.

Figure 6:
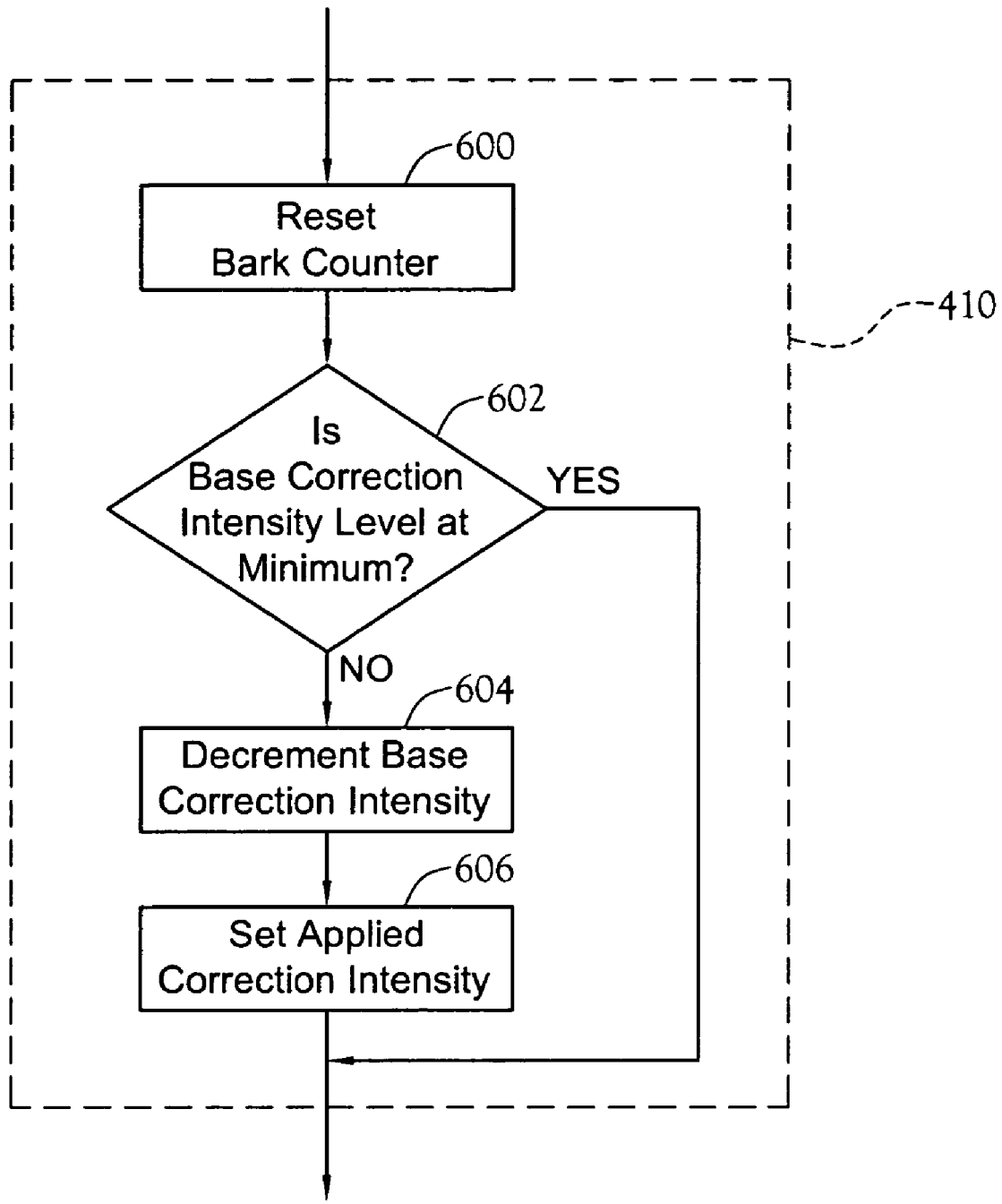
FIG. 6 is a flow diagram of the portion of the temperament learning method pertaining to reducing the base correction intensity.

FIG. 6 is a flow diagram examining the step of reducing 410 the base correction intensity in greater detail. Being the start of a new bark episode, the bark counter 110 is reset 600. The temperament learning method 200 determines 602 whether the base correction intensity value is already at the minimum value. If so, the base correction intensity is left at the minimum value. If greater than the minimum value, the base correction intensity is decremented 604. The applied correction intensity is set 606 using the new base correction intensity.

Depending upon the type of stimulus applied, the intensity is measured in various units. For example, with an electrical shock, changes in intensity occur are accomplished by changes in characteristics such as voltage. When using a canine audible deterrent include changes in intensity are accomplished by changes in characteristics such as amplitude, duration, or frequency. When using an olfactory deterrent, changes intensity are accomplished by changes in characteristics such as volume.

The apparatus and method described herein can vary in other embodiments without departing from the scope and spirit of the present invention. For example, the episode counter can be eliminated and the value of the base correction intensity simply initialized to a minimum value. However, no historical information about the number of barking episodes would be available.

An electronic animal trainer with temperament learning and the accompanying method has been shown and described. The electronic animal trainer with temperament learning includes a processing unit, a triggering unit (e.g., a bark detector) a stimulus generator and a stimulus delivery system, a bark counter, an episode counter, an episode timer, a time-out timer, a base correction intensity storage unit, and an applied correction intensity storage unit. By adjusting the base correction intensity, the electronic animal trainer with temperament learning provides a correction profile that is customized to the animal and varies the correction intensity in response to the behavior of the dog.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An electronic animal training apparatus that adjusts a correction profile for an animal based upon the animal's temperament, said electronic animal training apparatus comprising:
    a triggering unit for detecting a behavior of an animal, said triggering unit generating a trigger signal when the behavior is detected;
    a trigger counter responsive to said trigger signal, said trigger counter counting a number of trigger signals occurring within a behavior episode;
    an episode timer responsive to said trigger signal, said episode timer measuring a time between successive trigger signals to define said behavior episode;
    a base intensity storage unit for storing a starting value associated with the temperament of the animal, said starting value being updated after said behavior episode;
    an applied intensity storage unit holding a value corresponding to an intensity level for a stimulus applied to the animal starting from the value of said base intensity storage unit, said value in said applied intensity storage unit being increased during said behavior episode;
    a stimulus system for producing a stimulus at said applied intensity level in response to said trigger signal; and
    a processor responsive to said trigger signal.

2. The electronic animal training apparatus of claim 1 wherein said triggering unit is bark detector.

3. The electronic animal training apparatus of claim 1 further comprising a time-out timer in communication with said processor, said time-out timer counting for a specified time period during which said stimulus generation device is deactivated.

4. The electronic animal training apparatus of claim 1 further comprising an episode counter in communication with said processor, said episode counter tracking a number of distinct behavior episodes.

5. The electronic animal training apparatus of claim 4 wherein said episode counter increments when a specified time between one said trigger signal and a successive said trigger signal is counted by said episode timer.

6. The electronic animal training apparatus of claim 1 wherein the value in said applied intensity storage unit is the sum of said base intensity storage unit and a value of said trigger counter.

7. The electronic animal training apparatus of claim 1 wherein the value of said base intensity storage unit is updated at an end of a behavior episode, said end of a behavior episode being determined when passage of a specified amount of time is recorded by said episode timer.

8. The electronic animal training apparatus of claim 7 wherein the new value of said base intensity storage unit is equal to a trigger counter factor combined with the current value of said base intensity storage unit, said trigger counter factor corresponding to a result produced by multiplying the value of said trigger counter by a multiplier, said trigger counter factor being set to a negative integer when said result is less than one, said trigger counter factor being a positive integer when said result is greater than or equal to one.

9. An electronic animal training apparatus that adjusts a correction profile for an animal based upon the animal's temperament, said electronic animal training apparatus comprising:
   a triggering unit for detecting a behavior of an animal and generating a trigger signal;
   a stimulus generation device producing a stimulus signal upon activation;
   a stimulus delivery device in communication with said stimulus generation device, said stimulus delivery device transferring a stimulus at an applied intensity to the animal upon receipt of said stimulus signal; and
   a processor in communication with said triggering unit and said stimulus generation device, said processor programmed to perform a method comprising the steps of:
   (a) receiving a trigger signal from said triggering unit;
   (b) resetting a trigger count when said trigger signal occurs more than a specified time after a previous trigger signal;
   (c) incrementing said trigger count when said trigger signal occurs within a specified time of said previous trigger signal;
   (d) setting said applied intensity based upon said trigger count and a base intensity;
   (e) activating said stimulus generation device upon receiving said trigger signal; and
   (f) updating said base intensity using said trigger count when said trigger signal occurs more than a specified time after said previous trigger signal.

10. The electronic animal training apparatus of claim 9 wherein said triggering unit is bark detector.

11. The electronic animal training apparatus of claim 9 wherein said step (d) further comprises the step of adding said trigger count to said base intensity to produce said applied intensity.

12. The electronic animal training apparatus of claim 9 further comprising the step of:
   (g) preventing activation of said stimulus generation device for a specified time when a maximum number of corrections have been applied during a specified time period.

13. The electronic animal training apparatus of claim 12 wherein said step (g) further comprises the steps of:
   (ga) activating a time-out timer for a specified period; and
   (gb) ignoring said trigger signals during said specified period.

14. The electronic animal training apparatus of claim 9 wherein said step (f) further comprises the steps of:
   (fa) calculating a result by multiplying said trigger count by a modifier;
   (fb) rounding said result to an integer;
   (fc) adding said result to said base intensity when said result is a positive integer and said base intensity is not equal to a maximum value; and
   (fd) subtracting an integer from said base intensity when said result is equal to zero and said base intensity is not equal to a minimum value.

15. The electronic animal training apparatus of claim 9 wherein said step (f) further comprises the steps of:
   (fa) calculating a result by multiplying said trigger count by a modifier;
   (fb) adding said result to said base intensity when said result is greater than a specified value and said base intensity is not equal to a maximum value; and
   (fc) subtracting an integer from said base intensity when said result is less than a specified value and said base intensity is not equal to a minimum value.

16. An electronic animal training apparatus that adjusts a correction profile for an animal based upon the animal's temperament, said electronic animal training apparatus comprising:
   a triggering unit for detecting a behavior of an animal and generating a trigger signal;
   a stimulus generation device producing a stimulus signal upon activation;
   a stimulus delivery device in communication with said stimulus generation device, said stimulus delivery device transferring a stimulus at an applied intensity to the animal upon receipt of said stimulus signal; and
   a processor in communication with said triggering unit and said stimulus generation device, said processor programmed to perform a method comprising the steps of:
   (a) receiving a trigger signal from said triggering unit;
   (b) beginning a behavior episode on receiving said trigger signal more than a specified time after a previous trigger signal;
   (c) increasing an applied intensity upon receipt of a subsequent trigger signal during said behavior episode;
   (d) activating said stimulus generation device upon receipt of said trigger signal; and
   (e) updating a base intensity upon termination of said behavior episode.

17. The electronic animal training apparatus of claim 16 wherein said triggering unit is bark detector.

18. The electronic animal training apparatus of claim 16 wherein said step (b) further comprises the steps of:
   (ba) resetting a trigger count; and
   (bb) starting a behavior episode timer.

19. The electronic animal training apparatus of claim 16 wherein said step (c) further comprises the steps of:
   (ca) incrementing a trigger count upon receipt of a trigger signal;
   (cb) adding said trigger count to said base intensity to produce said applied intensity.

20. The electronic animal training apparatus of claim 16 wherein said step (e) further comprises the steps of:
   (ea) calculating a result by multiplying said trigger count by a modifier;
   (eb) rounding said result to an integer;
   (ec) adding said result to said base intensity when said result is a positive integer and said base intensity is not equal to a maximum value; and
   (ed) subtracting an integer from said base intensity when said result is equal to zero and said base intensity is not equal to a minimum value.

21. The electronic animal training apparatus of claim 16 wherein said step (e) further comprises the steps of:
   (ea) calculating a result by multiplying said trigger count by a modifier;
   (eb) adding said result to said base intensity when said result is greater than a specified value and said base intensity is not equal to a maximum value; and (ec) subtracting an integer from said base intensity when said result is less than a specified value and said base intensity is not equal to a minimum value.

22. The electronic animal training apparatus of claim 16 further comprising the step of:
 (f) preventing activation of said stimulus generation device for a specified time when a maximum number of corrections have been applied during a specified time period.

23. The electronic animal training apparatus of claim 22 wherein said step (f) further comprises the steps of:
 (fa) activating a time-out timer for a specified period; and
 (fb) ignoring said trigger signals during said specified period.

* * * * *